Patented Feb. 7, 1939

2,146,476

UNITED STATES PATENT OFFICE 2,146,476

PROCESS FOR THE PREPARATION OF OPTICALLY ACTIVE β-(p-HYDROXYPHENYL)-ISOPROPYLMETHYLAMINES

Gustav Hildebrandt, Mannheim, and Carl Freese, Ludwigshafen-on-the-Rhine, Germany, assignors, by mesne assignments, to E. Bilhuber Inc., Jersey City, N. J.

No Drawing. Application July 6, 1937, Serial No. 152,272. In Germany April 17, 1937

4 Claims. (Cl. 260—574)

The present invention relates to optically active β-(p-hydroxyphenyl)-isopropylmethylamines and a process for their preparation.

It is known that the racemic β-(p-hydroxyphenyl)-isopropylmethylamine is physiologically active and is said to exert similar effects to ephedrine and its salts.

According to this invention it has been found that the optically active β-(p-hydroxyphenyl)-isopropylmethylamines obtained by treating optically active β-(p-methoxyphenyl)-isopropylmethylamines with strong mineral acids at elevated temperatures exert therapeutic actions, which differ advantageously from those of the racemic compound.

Since optically active bases are frequently racemised or even partially decomposed by the action of strong mineral acids in the hot, it was by no means to be expected that the active β-(p-hydroxyphenyl)-isopropylmethylamines could be obtained, particularly in very good yields, by treating the corresponding derivatives, methylated at the OH group, with strong acids. Thus it was to be expected that on eliminating the methoxy group of the optically active β-(p-methoxyphenyl)-isopropylmethylamines the bases would be racemised.

Strong mineral acids, particularly strong hydrobromic acid, and also hydrochloric acid and the like are used for eliminating the methoxy group.

*Examples*

1. 20 gms. of d-β-(p-methoxyphenyl)-isopropylmethylamine (obtained by resolving the racemic base with optically active acids, for example optically active tartaric acid) are refluxed for about half an hour with 100 ccs. of 48% hydrobromic acid. The reaction is completed as soon as the evolution of methyl bromide has ceased. The excess hydrobromic acid is distilled off under reduced pressure and the residue is taken up in a small quantity of water and precipitated with ammonia. An approximately quantitative yield of d-β-(p-hydroxyphenyl)-isopropylmethylamine in a pleasing crystalline form of melting point 131° to 132° C. is obtained. The sulphate of the base in 4% aqueous solution shows a specific rotation of $$[\alpha]_D^{21°} = +14.1°$$

2. 20 gms. of l-β-(p-methoxyphenyl)-isopropylmethylamine (obtained by resolving the racemic base with optically active acid) are heated for one hour to 130° C. in a closed vessel with strong hydrochloric acid. The reaction mixture is worked up into l-β-(p-hydroxyphenyl)-isopropylmethylamine as described in Example 1. Yield, melting point and specific rotation as in Example 1 (with correspondingly reversed sign).

What we claim is:—

1. A process for the preparation of optically active β-(p-hydroxyphenyl)-isopropylmethylamines, which consists in treating optically active β-(p-methoxyphenyl)-isopropylmethylamines with a strong mineral acid heated at least to its boiling point.

2. A process for the preparation of optically active β-(p-hydroxyphenyl)-isopropylmethylamines, which consists in treating optically active β-(p-methoxyphenyl)-isopropylmethylamines with strong hydrobromic acid.

3. The chemical compounds optically active β-(p-hydroxyphenyl)-isopropylmethylamines of the group consisting of d-β-(p-hydroxyphenyl)-isopropylmethylamine and l-β-(p-hydroxyphenyl)-isopropylmethylamine.

4. A process for the preparation of optically active β-(p-hydroxyphenyl)-isopropylmethylamines which consists in demethylating optically active β-(p-methoxyphenyl)-isopropylmethylamines with a strong hydrohalic acid heated at least to its boiling point.

GUSTAV HILDEBRANDT.
CARL FREESE.